(12) United States Patent
Lynam

(10) Patent No.: US 11,205,083 B2
(45) Date of Patent: Dec. 21, 2021

(54) VEHICULAR DRIVER MONITORING SYSTEM

(71) Applicant: Magna Electronics Inc., Auburn Hills, MI (US)

(72) Inventor: Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 90 days.

(21) Appl. No.: 16/836,968

(22) Filed: Apr. 1, 2020

(65) Prior Publication Data

US 2020/0320320 A1    Oct. 8, 2020

Related U.S. Application Data

(60) Provisional application No. 62/828,128, filed on Apr. 2, 2019.

(51) Int. Cl.
*G06K 9/00* (2006.01)
*B60W 40/09* (2012.01)

(52) U.S. Cl.
CPC ......... *G06K 9/00845* (2013.01); *B60W 40/09* (2013.01); *G06K 9/00255* (2013.01)

(58) Field of Classification Search
None
See application file for complete search history.

(56) References Cited

U.S. PATENT DOCUMENTS

| | | |
|---|---|---|
| 5,670,935 A | 9/1997 | Schofield et al. |
| 5,715,093 A | 2/1998 | Schierbeek et al. |
| 5,760,962 A | 6/1998 | Schofield et al. |
| 5,796,094 A | 8/1998 | Schofield et al. |
| 5,877,897 A | 3/1999 | Schofield et al. |
| 6,201,642 B1 | 3/2001 | Bos |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,559,435 B2 | 5/2003 | Schofield et al. |
| 6,590,719 B2 | 7/2003 | Bos |
| 6,690,268 B2 | 2/2004 | Schofield et al. |
| 6,717,610 B1 | 4/2004 | Bos et al. |
| 6,757,109 B2 | 6/2004 | Bos |

(Continued)

*Primary Examiner* — Santiago Garcia
(74) *Attorney, Agent, or Firm* — Honigman LLP

(57) ABSTRACT

A vehicular driver monitoring system includes an illumination source that, when powered, emits light that illuminates at least a portion of a driver of the vehicle. A camera is disposed at the interior of the vehicle and views the portion of the driver. A control includes an image processor that processes captured image data. The illumination source is controlled to modulate intensity of light emitted by the illumination source. The image data output is processed to distinguish a component of the image data output that arises from the illumination source illuminating the portion of the driver from a component of the image data output that arises from ambient light illuminating the portion of the driver. The control filters the image data output to reduce the distinguished component that arises from ambient light and, responsive to processing of the filtered image data output, monitors the portion of the driver.

20 Claims, 1 Drawing Sheet

(56) References Cited

U.S. PATENT DOCUMENTS

| | | |
|---|---|---|
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,922,292 B2 | 7/2005 | Bos |
| 6,946,978 B2 | 9/2005 | Schofield |
| 7,004,606 B2 | 2/2006 | Schofield |
| 7,005,974 B2 | 2/2006 | McMahon et al. |
| 7,038,577 B2 | 5/2006 | Pawlicki et al. |
| 7,123,168 B2 | 10/2006 | Schofield |
| 7,311,406 B2 | 12/2007 | Schofield et al. |
| 7,480,149 B2 | 1/2009 | DeWard et al. |
| 7,720,580 B2 | 5/2010 | Higgins-Luthman |
| 7,914,187 B2 | 3/2011 | Higgins-Luthman et al. |
| 7,937,667 B2 | 5/2011 | Kramer et al. |
| 7,965,336 B2 | 6/2011 | Bingle et al. |
| 8,256,821 B2 | 9/2012 | Lawlor et al. |
| 8,446,470 B2 | 5/2013 | Lu et al. |
| 8,451,107 B2 | 5/2013 | Lu et al. |
| 8,542,451 B2 | 9/2013 | Lu et al. |
| 8,725,311 B1* | 5/2014 | Breed ............... A61B 5/0507 701/1 |
| 9,041,806 B2 | 5/2015 | Baur et al. |
| 9,126,525 B2 | 9/2015 | Lynam et al. |
| 9,405,120 B2 | 8/2016 | Graf et al. |
| 9,596,387 B2 | 3/2017 | Achenbach et al. |
| 9,871,971 B2 | 1/2018 | Wang et al. |
| 9,896,039 B2 | 2/2018 | Achenbach et al. |
| 10,017,114 B2 | 7/2018 | Bongwald |
| 10,046,706 B2 | 8/2018 | Larson et al. |
| 10,065,574 B2 | 9/2018 | Tiryaki |
| 10,442,360 B2 | 10/2019 | LaCross et al. |
| 10,793,067 B2 | 10/2020 | Ihlenburg et al. |
| 2002/0003571 A1* | 1/2002 | Schofield ............ B60R 11/0235 348/148 |
| 2003/0209893 A1* | 11/2003 | Breed ................. B60N 2/0248 280/735 |
| 2004/0129478 A1* | 7/2004 | Breed .................. B60N 2/0276 180/273 |
| 2009/0244361 A1 | 10/2009 | Gebauer et al. |
| 2010/0020170 A1 | 1/2010 | Higgins-Luthman et al. |
| 2011/0122049 A1* | 5/2011 | Lvovskiy ........... G02B 27/0101 345/1.3 |
| 2013/0016409 A1 | 1/2013 | Kurtz et al. |
| 2014/0285666 A1 | 9/2014 | O'Connell et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2017/0372143 A1* | 12/2017 | Barcus ............... G06K 9/00785 |
| 2018/0134217 A1 | 5/2018 | Peterson et al. |
| 2018/0222414 A1 | 8/2018 | Ihlenburg et al. |
| 2019/0001930 A1* | 1/2019 | Dellock ................ A61L 2/088 |
| 2019/0052792 A1* | 2/2019 | Baba .................... H04N 5/2256 |
| 2019/0156134 A1* | 5/2019 | Krishnan ............... A61B 5/225 |
| 2019/0377933 A1* | 12/2019 | Hara .................. G06K 9/00248 |
| 2020/0104571 A1* | 4/2020 | Osuga ............... B60R 21/01538 |
| 2020/0143560 A1 | 5/2020 | Lu et al. |
| 2020/0148098 A1* | 5/2020 | Salter ..................... G06F 3/013 |
| 2020/0202151 A1 | 6/2020 | Wacquant |
| 2020/0247315 A1* | 8/2020 | Foutis .................... B60Q 3/80 |
| 2020/0320320 A1 | 10/2020 | Lynam |
| 2021/0155167 A1 | 5/2021 | Lynam et al. |
| 2021/0162926 A1 | 6/2021 | Lu |
| 2021/0199954 A1* | 7/2021 | Kawasaki .......... G02B 27/0018 |
| 2021/0245662 A1 | 8/2021 | Blank et al. |

* cited by examiner

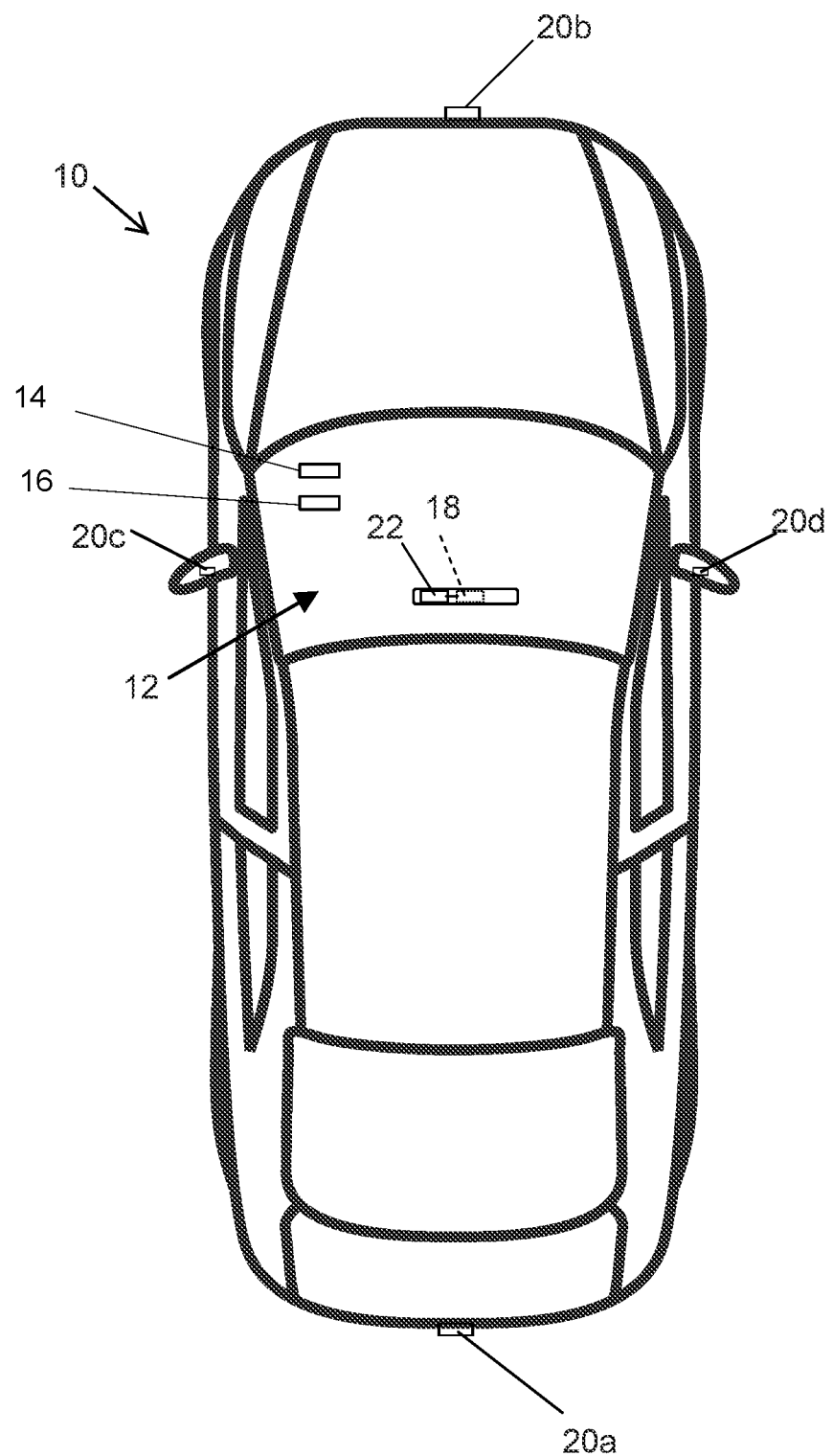

VEHICULAR DRIVER MONITORING SYSTEM

CROSS REFERENCE TO RELATED APPLICATION

The present application claims the filing benefits of U.S. provisional application Ser. No. 62/828,128, filed Apr. 2, 2019, which is hereby incorporated herein by reference in its entirety.

FIELD OF THE INVENTION

The present invention relates generally to a vision system for a vehicle and, more particularly, to a vehicular vision system that utilizes one or more cameras to monitor attentiveness of the driver of the vehicle.

BACKGROUND OF THE INVENTION

Driver attentiveness is an important element of safe driving, with driver distraction and/or driver fatigue being significant contributors to road accidents and the like. Driver monitoring systems utilizing an in-cabin mounted camera that images the head/face/eyes of the driver to determine driver attentiveness are known. However, such known driver monitoring systems have disadvantages, especially when the driver is driving the vehicle during daylight and on sunny days.

SUMMARY OF THE INVENTION

The present invention provides a driver monitoring system for a vehicle that utilizes one or more cameras to capture image data representative of images interior of the vehicle, and provides an illumination source that emits light that illuminates at least a portion of a driver of the vehicle. The illumination source modulates or codes the emitted light so that the system (via processing of image data captured by the camera) can process image data in accordance with the modulated light to avoid image washout that may otherwise occur in high ambient lighting conditions, such as a sunny day. A control includes an image processor operable to process image data captured by the camera. The camera captures image data representative of the light that is emitted by the illumination source and that reflects off the illuminated portion of the driver of the vehicle. The control, responsive to processing of image data captured by the camera, monitors the illuminated portion of the driver to determine the driver's attentiveness.

The light emitted by the illumination source may be in a near infrared (near IR) spectral region that is invisible to the human eye, and that is outside the visible spectral region present in insolation (solar radiation at a given area) and that is at a wavelength within the sensitivity of the camera. The camera may comprise a CMOS imaging array sensor (comprising multiple rows and columns of photosensing elements) that is sensitive within the near infrared spectral region.

Because the intensity of light emitted by the illumination source that is incident at the imaging sensor of the camera is modulated at the frequency of light emitted modulation of the light emitter, electronic analysis/filtering of the signal output of the imaging sensor of the camera can be used to distinguish the information of interest (i.e., the episodically illuminated driver's head region) from ambient lighting/sunlight directly impinging on the imaging sensor (that is not modulated as is the light emitted by the illumination source). The present invention is particularly advantageous in distinguishing the information of interest from ambient lighting when sunlight is streaming through side windows of the vehicle or through a rear window of the vehicle so as to be directly incident on the imaging array that views into the vehicle cabin towards the driver's head region.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a driver monitoring system that incorporates a camera and light source in accordance with the present invention.

DESCRIPTION OF THE PREFERRED EMBODIMENTS

Referring now to the drawings and the illustrative embodiments depicted therein, a vehicle 10 includes an imaging system or vision system 12 that includes at least one interior or driver monitoring camera 14 and a light source or illumination source 16 (FIG. 1). Illumination source 16 [which may be an array of individual light emitters, such as an array of a plurality of light emitting diodes (LEDs) that preferably are near-IR light emitting diodes (NIR LEDs)] is positioned and oriented in the interior cabin of the equipped vehicle so as to illuminate at least the front head region of the driver of the equipped vehicle. The vision system 12 includes a control (that comprises a processor) or electronic control unit (ECU) 18 that includes electronic circuitry and associated software, with the electronic circuitry comprising a processor that is operable to process image data captured by the camera to determine attentiveness of the driver of the vehicle. The data transfer or signal communication from the camera to the ECU may comprise any suitable data or communication link, such as a vehicle network bus or the like of the equipped vehicle. The illumination source may be light-intensity modulated or controlled such that light emitted by the illumination source has a modulated intensity to illuminate the driver's head region with a modulated light intensity having a characteristic modulation signature.

The camera has an imaging array sensor (comprising multiple rows and columns of photosensing elements) that is sensitive to at least the spectral region of the light emitted by the illumination source. The ECU may electronically or digitally filter the output signal of the imaging array sensor of the camera to distinguish the component of that output arising from the light-intensity modulated illuminated driver's head (as illuminated by the illumination source when modulated) from the component of the output signal of the imaging array sensor due to illumination of the driver's head by ambient lighting (typically sunlight streaming into the interior cabin such as though the windows of the quipped vehicle, and especially through side windows and/or the rear window). By syncing the camera frame capture rate with the intensity modulation rate of the illumination source, the system can compare illuminated frames of image data with non-illuminated frames of image data to provide enhanced processing and to avoid image washout issues in bright sunlight conditions.

For example, the camera may capture frames of image data at 60 frames per second and the illumination source may be modulated so that it is at its high intensity 30 times per second (and thus at its low intensity 30 times per second), whereby every other frame of image data captured by the camera is of the illuminated driver's head region. The system compares the frames of image data captured when the illumination source is activated to the frames of image data captured when the illumination source is not activated to determine the component of the captured image data that is due to the illumination source and the component of the captured image data that is due to ambient light, and the system may then filter the output signal or adjust the camera settings to reduce or remove the component of the captured image data that is due to ambient light, so as to avoid washout during bright lighting conditions.

The driver monitoring camera 14 captures image data representative of the driver's head. The interior cabin-viewing camera may be disposed at any suitable location in interior cabin of the vehicle, such as at a dashboard or instrument panel of the vehicle or within the movable head of an interior rearview mirror or part of a windshield electronics module (that includes a forward-viewing camera for advanced driver assistance functions such as described in U.S. Pat. Nos. 9,896,039; 9,871,971; 9,596,387; 8,256,821; 7,480,149; 6,824,281 and/or 6,690,268, which are all hereby incorporated herein by reference in their entireties) with the field of view of the cabin-viewing camera encompassing the driver head region in the vehicle (either directly or via a reflector). The light source 16 is operable to illuminate the driver front head region in a manner that enhances capturing and processing of image data in high ambient lighting conditions, as discussed below.

Driver monitoring systems may be used to track the head and eyes of the driver of a vehicle. To accurately track the eyes of the driver, the pupils of the eyes must be clearly viewed by a camera or other imaging device. Because of this, a preferred camera position is directly in front of the driver and at or below a line-of-sight to the road. This allows the camera to view both pupils in most situations and also avoid having the driver's eyelashes in the way (which is a problem that occurs when cameras are mounted above the line-of-sight to the road). In high ambient lighting conditions, image washout is a concern and the system may not be as capable of detecting the slight changes and differences in the driver's gaze or attentiveness.

The driver monitoring system of the present invention uses an additional light source 16 that modulates (e.g., modulates the intensity of or encodes a modulation signal on) the light that is emitted by the light source to illuminate the driver's face. The camera senses that light and the image processor processes image data captured by the camera when sensing that light and when not sensing that light and/or to distinguish light having a characteristic light modulation signature to provide enhanced sensing capabilities to monitor the driver's head and eyes. The system then can subtract out or filter out the images to remove the high ambient light component of the captured image data so that the image data is not washed out on a sunny day or other high ambient lighting conditions.

The light source 16 may emit visible and/or non-visible (e.g., infrared or near-infrared) light, and may comprise a light emitting diode (LED) or other light source disposed in the vehicle that emits the light toward the driver's head region, whereby the camera images the illuminated driver's head. The LED and camera may operate together when the driver monitoring system is operating. The LED may be disposed at the camera or the LED may be disposed elsewhere in the vehicle and emit light generally directly toward the driver's head region.

The light source may emit visible and/or non-visible light. During daytime lighting conditions, it does not matter if the driver's head is illuminated with extra visible light, since the driver will not typically notice that due to the sunlight present. During nighttime lighting conditions, the potential image washout due to the sun is less of a concern.

Sunlight comprises substantial amount of visible, UV and IR/near IR radiation. On average, most of the solar energy is between 300 nm and 2,100 nm, while Ultraviolet (UV) radiation constitutes around 3 percent of solar radiation (up to 400 nm), visible light or radiation constitutes around 48 percent (between 400 nm and 700 nm), and infrared (IR) light or radiation constitutes around 49 percent. NIR LEDs with wavelengths 770 nm or 870 nm or 880 nm or 940 nm or 950 nm are available from the likes of Excelitas Technologies with a place of business in Waltham, Mass., and pulsed semiconductor lasers in the near IR (NIR) are also available from the likes of Excelitas Technologies, which offers a wide range of pulsed 905 nm lasers including monolithic layered structures with up to 4 active areas per chip, resulting in up to 100 Watts of peak output power.

The system of the present invention modulates the light emitted by the light source, such as by modulating the intensity of the light emitted by the light source. For example, the light source may emit a particular spectral band of light (such as IR or near IR light) or may emit visible light covering a wide spectral band, and the light source may be pulsed or modulated to turn on/off the emitted light and/or increase/decrease the intensity of the emitted light. The light source may comprise a white light-emitting LED or a red light-emitting LED or the like, and may be modulated during daytime lighting conditions, whereby the driver's head is illuminated with the additional light. In bright sunlight, the white light-emitted LED may be dominated by the sunlight, so the system may reduce the light sensitivity of the camera to a level where the image washout is reduced. For example, when the ambient light level is high (such as greater than, for example, 10,000 lux), then the system may reduce the sensitivity of the camera and/or may increase the intensity of the peak illumination levels of the white light-emitting LED.

Optionally, the light emitted by the illumination source may be in a near infrared (near IR) spectral region that is invisible to the human eye, and that is outside the visible spectral region present in insolation (solar radiation at a given area) and that is at a wavelength within the spectral sensitivity of the camera. Because the intensity of light emitted by the illumination source that is incident at the imaging sensor of the camera is modulated, electronic analysis/processing/filtering of the signal output of the imaging sensor of the camera can be used to distinguish the information of interest (i.e., the light-modulated illuminated driver's head region) from ambient lighting/sunlight that is or may be directly impinging on the imaging sensor (and that is not modulated by the control or system). Thus, the system can process and compare the frames of image data (illuminated and non-illuminated) to determine differences and to filter out the direct sunlight effects to provide enhanced sensing and monitoring of the driver's head and eyes. The present invention is particularly advantageous in distinguishing the information of interest from ambient lighting when sunlight is streaming through side windows of the vehicle or through a rear window of the vehicle so as to be directly incident on the imaging array that views into the vehicle cabin towards the driver's head region.

Thus, the system uses a light emitting illumination source (that modulates the light emitted thereby) and a camera to monitor, for example, the head and/or eyes of a driver of a vehicle. Using the selected modulation of the light source, the system processes image data captured by the camera to detect and monitor the driver's head illuminated by the modulated light. The system may, for example, determine the general viewing direction of the driver, the focal distance of the driver's gaze, or alertness of the driver.

The driver monitoring system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 7,311,406 and/or 6,523,964, and/or U.S. Publication Nos. US-2017-0274906; US-2016-0137126; US-2015-0352953; US-2015-0296135; US-2015-0294169; US-2015-0232030; US-2015-0022664; US-2015-0015710; US-2015-0009010 and/or US-2014-0336876, and/or U.S. patent application Ser. No. 16/718,860, filed Dec. 18, 2019, and/or Ser. No. 16/668,035, filed Oct. 30, 2019, which are all hereby incorporated herein by reference in their entireties.

The vehicle or vision system may include at least one exterior viewing imaging sensor or camera, such as a rearward viewing imaging sensor or camera 20a (and the system may optionally include multiple exterior viewing imaging sensors or cameras, such as a forward viewing camera 20b at the front (or at the windshield) of the vehicle, and a sideward/rearward viewing camera 20c, 20d at respective sides of the vehicle), which captures images exterior of the vehicle, with the camera having a lens for focusing images at or onto an imaging array or imaging plane or imager of the camera (FIG. 1). For example, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). A display 22 in the vehicle may display video images derived from or representative of image data captured by the cameras.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:

an illumination source disposed in a cabin of a vehicle equipped with the vehicular driver monitoring system, wherein the illumination source, when electrically powered, emits light that illuminates at least a portion of a driver of the vehicle;

a camera disposed in the cabin of the vehicle and having a field of view, wherein the at least a portion of the driver of the vehicle is within the field of view of the camera;

a control comprising electronic circuitry and associated software, wherein the electronic circuitry comprises an image processor that processes image data captured by the camera;

wherein the illumination source is electrically controlled to modulate intensity of light emitted by the illumination source so that intensity of light emitted by the illumination source has a characteristic light-modulation signature;

wherein the camera captures image data representative of (i) ambient light that is reflected off the at least a portion of the driver of the vehicle and (ii) light emitted by the illumination source having the characteristic light-modulation signature that is reflected off the at least a portion of the driver of the vehicle;

wherein image data captured by the camera is output by the camera for processing at the control;

wherein processing of image data at the control distinguishes light emitted by the illumination source having the characteristic light-modulation signature from ambient light; and wherein the vehicular driver monitoring system monitors the at least a portion of the driver responsive to processing at the control of the image data that arises from light emitted by the illumination source having the characteristic light-modulation signature.

2. The vehicular driver monitoring system of claim 1, wherein processing of the image data at the control distinguishes light incident on the at least a portion of the driver of the vehicle that has the characteristic light-modulation signature from ambient light incident on the at least a portion of the driver of the vehicle that lacks the characteristic light-modulation signature.

3. The vehicular driver monitoring system of claim 1, wherein the control electronically processes the image data.

4. The vehicular driver monitoring system of claim 1, wherein the control digitally processes the image data output.

5. The vehicular driver monitoring system of claim 1, wherein the processing of the image data at the control removes a component of the image data that arises from ambient light that is reflected off the at least a portion of the driver.

6. The vehicular driver monitoring system of claim 1, wherein the illumination source is episodically activated.

7. The vehicular driver monitoring system of claim 1, wherein the camera captures image data when the illumination source is electrically powered and when the illumination source is not electrically powered.

8. The vehicular driver monitoring system of claim 1, wherein the illumination source emits near-infrared (NIR) light.

9. The vehicular driver monitoring system of claim 1, wherein the illumination source comprises at least one light emitting diode.

10. The vehicular driver monitoring system of claim 1, wherein the illumination source emits visible light.

11. The vehicular driver monitoring system of claim 1, wherein the at least a portion of the driver comprises the head or eyes of the driver.

12. The vehicular driver monitoring system of claim 1, wherein the illumination source is electrically powered responsive at least in part to an ambient light level at the vehicle.

13. The vehicular driver monitoring system of claim 12, wherein the illumination source is not electrically powered when the ambient light level is below a threshold level.

14. The vehicular driver monitoring system of claim 12, wherein the illumination source is electrically powered when the ambient light level is above a threshold level.

15. A vehicular driver monitoring system, the vehicular driver monitoring system comprising:
an illumination source disposed in a cabin of a vehicle equipped with the vehicular driver monitoring system, wherein the illumination source, when electrically powered, emits light that illuminates at least the head of a driver of the vehicle;
wherein the illumination source comprises at least one light emitting diode;
wherein the illumination source emits near-infrared (NIR) light;
a camera disposed in the cabin of the vehicle and having a field of view, wherein at least the head of the driver of the vehicle is within the field of view of the camera;
a control comprising electronic circuitry and associated software, wherein the electronic circuitry comprises an image processor that processes image data captured by the camera;
wherein the illumination source is electrically controlled to modulate intensity of light emitted by the illumination source;
wherein the camera captures image data representative of (i) ambient light that is reflected off at least the head of the driver of the vehicle and (ii) light emitted by the illumination source that is reflected off at least the head of the driver of the vehicle;
wherein image data captured by the camera is output by the camera for processing at the control;
wherein processing at the control of the image data captured by the camera distinguishes light emitted by the illumination source from ambient light;
wherein the vehicular driver monitoring system monitors the head of the driver responsive to processing at the control of the image data that arises from light emitted by the illumination source.

16. The vehicular driver monitoring system of claim 15, wherein the illumination source is episodically activated, and wherein the camera captures image data when the illumination source is electrically powered and when the illumination source is not electrically powered.

17. The vehicular driver monitoring system of claim 15, wherein the illumination source is electrically powered responsive at least in part to an ambient light level at the vehicle.

18. A vehicular driver monitoring system, the vehicular driver monitoring system comprising:
an illumination source disposed in a cabin of a vehicle equipped with the vehicular driver monitoring system, wherein the illumination source, when electrically powered, emits light that illuminates at least the head of a driver of the vehicle;
wherein the illumination source comprises at least one light emitting diode;
a camera disposed in the cabin of the vehicle and having a field of view, wherein at least the head of the driver of the vehicle is within the field of view of the camera;
a control comprising electronic circuitry and associated software, wherein the electronic circuitry comprises an image processor that processes image data captured by the camera;
wherein the illumination source is electrically controlled to modulate intensity of light emitted by the illumination source;
wherein the camera captures image data representative of (i) ambient light that is reflected off at least the head of the driver and (ii) light emitted by the illumination source that is reflected off at least the head of the driver of the vehicle;
wherein image data captured by the camera is output by the camera for processing at the control;
wherein processing at the control of the image data captured by the camera distinguishes light emitted by the illumination source from ambient light;
wherein the vehicular driver monitoring system adjusts a setting of the camera to reduce the distinguished ambient light; and
wherein the vehicular driver monitoring system monitors at least the head of the driver responsive to processing at the control of the image data that arises from light emitted by the illumination source.

19. The vehicular driver monitoring system of claim 18, wherein the illumination source is episodically activated, and wherein the camera captures image data when the illumination source is electrically powered and when the illumination source is not electrically powered.

20. The vehicular driver monitoring system of claim 18, wherein the illumination source is electrically powered responsive at least in part to an ambient light level at the vehicle.

* * * * *

UNITED STATES PATENT AND TRADEMARK OFFICE
CERTIFICATE OF CORRECTION

Page 1 of 1

PATENT NO.         : 11,205,083 B2
APPLICATION NO.    : 16/836968
DATED              : December 21, 2021
INVENTOR(S)        : Niall R. Lynam It is certified that error appears in the above-identified patent and that said Letters Patent is hereby corrected as shown below:

In the Claims

<u>Column 7</u>
Claim 15, Line 44, "ambient light;" should be --ambient light; and--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*